United States Patent Office.

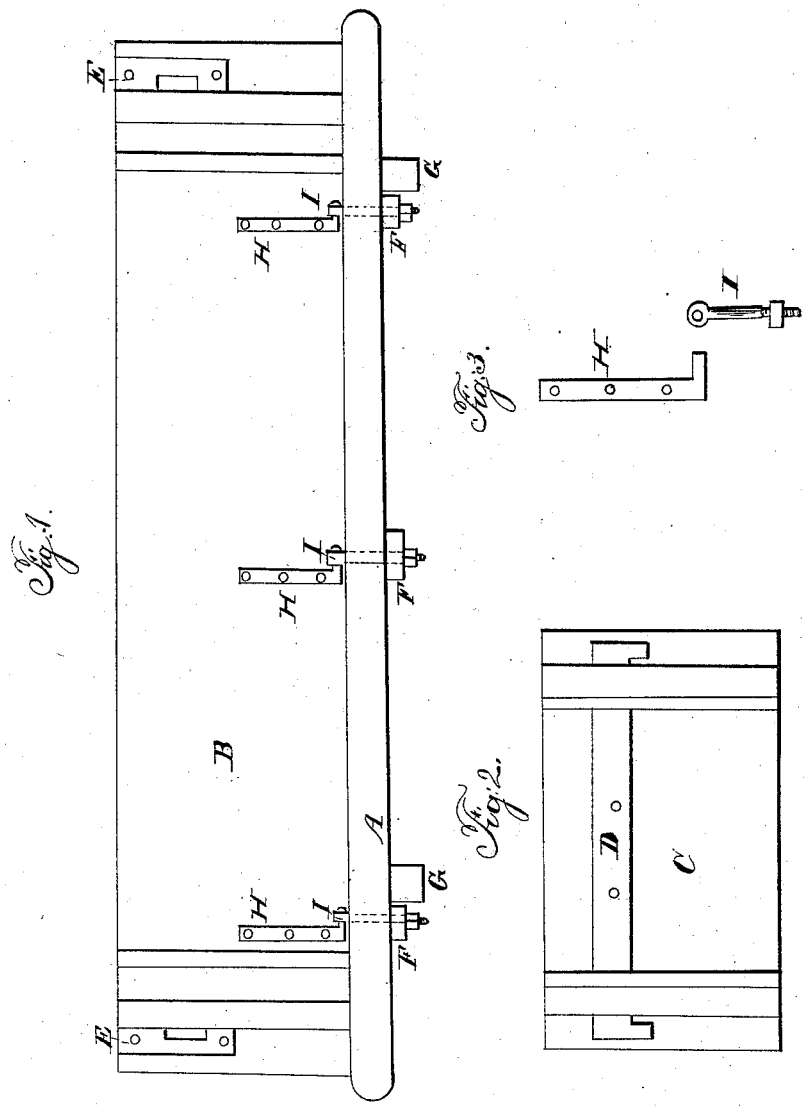

GEORGE W. OVIATT, OF POTTER CENTRE, NEW YORK.

Letters Patent No. 63,931, dated April 16, 1867.

IMPROVEMENT IN WAGON-BOXES.

*The Schedule referred to in these Letters Patent and making part of the same.*

TO ALL WHOM IT MAY CONCERN:

Be it known that I, GEORGE W. OVIATT, of Potter Centre, in the county of Yates, and State of New York, have invented a new and useful Improvement in Wagon-Boxes; and I do hereby declare that the following is a full, clear, and exact description of the construction and operation of the same, reference being had to the annexed drawings, making a part of this specification, in which—

Figure 1 is a longitudinal section.

Figure 2, an outside view of the end part of the box; and

Figure 3, a view of the fastenings for the sides of the box.

The letters of reference refer to the same parts in each figure.

The nature of my invention consists in making a wagon-box or body and fastening it together in such manner that it may be readily taken apart and put together, and when put together it will keep tight when the box is used; also prevent the noise or rattling common to ordinary wagon-boxes.

To enable others skilled in the art to make and use my invention, I will proceed to describe its mode of construction and operation.

A is the bottom of the box; it is made in any ordinary manner; it is provided with a series of eye-bolts, I, that pass down through it and the cleats F, as shown in fig. 1. B is one of the sides of the box, made in the usual method, and is provided with a series of strap-bolts, H, that are fastened to it, as shown in fig. 1. To put the box together place the side inward a little, then push it forward so that the bolts H will enter the eye-bolts; then turn it outward to the bolster-stake. On the outside are fastened pieces of any ordinary construction that will fit to the sides of the stake to prevent it moving back or forward when used, and it is provided with cleats at the ends, as shown in fig. 1. These cleats hold the end piece in position. C is one of the end pieces; it is represented by figure 2; it is provided with a cleat at each end that is used to prevent its warping or splitting, and has a channel cut into it to receive the spring-catch D. D is a spring-catch; it is made as shown in fig. 2; it is securely fastened within the channel of the end pieces; it must be bent outward toward the ends and be made so as to spring into the catch E when the end piece is in place; it must be long enough to extend from the cleats of one side piece to the other for the purpose of preventing the box spreading and have a projection downward, as shown in the figure, to hook behind the catch E. E and E are catches, securely fastened to the outward cleats, as shown in fig. 1; they have a notch in the edge and about in the middle to receive the spring-catch D; there is a chamber made underneath them for the end of the spring-catch D, so that it may spring into the proper place to hold the box together, and prevent the end piece being raised until the spring is pushed inward to loose it. F is one of a series of cleats fastened to the under side of the bottom by the eye-bolts I; two of them should be close to the bolsters to prevent the box being moved backward or forward when used. G and G are the bolsters upon which the box is placed. H is one of a series of strap-bolts, made as represented in fig. 3; they are securely fastened to the inside of the box, as shown in fig. 1; their use is to hold the side pieces B to the bottom. I is one of a series of eye-bolts; they are represented in fig. 3; they have a nut at the lower end to hold them, and when necessary they may be screwed tighter to prevent the box leaking or rattling; they should be drawn down so that the side and bottom will form a tight joint when the side is up in place.

Having thus fully described my invention, what I claim as new, and desire to secure by Letters Patent, is—

1. I claim securing the sides of a wagon-box to the bottom by means of the bolts H and I, substantially as specified.

2. I claim securing the end boards of a wagon-box in their place by the use of the spring-catch D and catches E and E, as herein set forth.

GEORGE W. OVIATT.

Witnesses:
EZRA W. PLIMPTON,
BENJAMIN L. HOYT.